United States Patent [19]

Goldberg

[11] 4,269,659
[45] May 26, 1981

[54] NEUTRON GENERATOR

[76] Inventor: Leon Goldberg, 9921 Bedfordshire Ct., Potomac, Md. 20854

[21] Appl. No.: 891,338

[22] Filed: Mar. 29, 1978

Related U.S. Application Data

[63] Continuation-in-part of Ser. No. 396,537, Sep. 12, 1973, abandoned, which is a continuation of Ser. No. 24,151, Mar. 23, 1970, abandoned.

[51] Int. Cl.³ .............................................. G21C 1/00
[52] U.S. Cl. ........................................ 176/9; 176/39; 60/203
[58] Field of Search ...................... 176/1, 3, 5, 9, 6–8, 176/45, 39; 60/202, 203, 258

[56] References Cited

U.S. PATENT DOCUMENTS

| | | | |
|---|---|---|---|
| 2,637,973 | 5/1953 | Lawrence | 60/258 |
| 3,150,485 | 9/1964 | Hickerson | 60/258 |
| 3,202,582 | 8/1965 | Rom | 60/203 |
| 3,225,236 | 12/1965 | Meyer | 176/3 |
| 3,234,731 | 2/1966 | Dermody et al. | 60/258 |
| 3,309,873 | 3/1967 | Cann | 60/203 |
| 3,321,919 | 5/1967 | Marolda | 60/202 |
| 3,324,316 | 4/1967 | Cann | 60/202 |
| 3,346,458 | 10/1967 | Schmidt | 176/1 |
| 3,505,550 | 4/1970 | Levoy et al. | 60/202 |

FOREIGN PATENT DOCUMENTS

| | | | |
|---|---|---|---|
| 1613117 | 1/1971 | Fed. Rep. of Germany | 176/9 |
| 1342811 | 10/1963 | France | 176/39 |
| 908469 | 10/1962 | United Kingdom | 176/9 |

OTHER PUBLICATIONS

Wash-1267, 7/73, pp. 3–5, 7–10, 12–19, 22–27, 33, 34.
Astronautics 10/59, pp. 23–25, Grey.
"Source Book on Atomic Energy" Glasstone, (van Nostrand Reinhold Co. N. Y. 1967), pp. 73–78, 537–561.

Primary Examiner—Harvey E. Behrend
Attorney, Agent, or Firm—Cantor and Singer

[57] ABSTRACT

A neutron generator utilizing relatively small plasma pulses which are constantly re-created in the reaction chamber in a conventional manner by injecting pulses of a fuel such as deuterium or deuterium and tritium, in either a gaseous or small solid pellet form, ionizing the same and compressing the same to form a plasma, while surrounding the plasma with a working gas such as hydrogen under pressure moving longitudinally through the chamber and carrying the plasma with it. As each pulse of plasma is dissipated into the working gas and carried out of the chamber, this completes its life cycle. New cycles are initiated in an appropriate manner to maintain an orderly and nearly continuous energy addition and extraction to and through the background gas.

5 Claims, 6 Drawing Figures

NEUTRON GENERATOR

CROSS-REFERENCE TO RELATED APPLICATIONS

This application is a continuation-in-part of my co-pending application, Ser. No. 396,537, filed Sept. 12, 1973 now abandoned, which, in turn, is a continuation of my application Ser. No. 24,151, filed Mar. 23, 1970, now abandoned, both of which are embodied herein by reference in their entirety.

BACKGROUND OF THE INVENTION

This invention relates to the generation of energy, and more particularly, this invention relates to a device for generating neutrons by a fusion plasma.

Nuclear fusion is one of the primary nuclear reactions. The name indicates an energy-releasing rearrangement collision which can occur between various isotopes of low atomic number.

There is a great deal of interest in fusion plasmas in the hope that they may be used to produce useful power. There are several advantages to a fusion reaction which make it so appealing. Since a primary fusion fuel, deuterium, occurs naturally and is obtainable in virtually inexhaustible supply (by separation of heavy hydrogen from water, one atom of deuterium occurring per 6500 atoms of hydrogen), solution of the fusion power problem can permanently solve the problem of energy production for mankind with far less pollution of his environment. As a power source, the small amount of radioactive waste products from the fusion reaction is another argument in its favor as opposed to fusion of uranium. Also, a fusion reactor, by virtue of the small amount of fusionable material in the reactor at any time, would not explode.

In a nuclear fusion reaction the close encounter of two energy rich nuclei results in a mutual rearrangement of their nucleons (protons and neutrons) to produce two or more reaction products, together with a release of energy. The energy usually appears in the form of kinetic energy of the reaction products, although when energetically allowed, part may be taken up as energy of an excited state of the product nucleus. In contrast to neutron-produced nuclear fission reactions, colliding nuclei, because they are positively charged, require a substantial initial relative kinetic energy to overcome their mutual electrostatic repulsion so that reaction can occur. The largest reaction cross-section for fusion is between a mixture of the heavy isotopes of hydrogen, deuterium and tritium, which is a hundred times larger than the next most probably fuel mixture, that of deuterium itself. Thus, the mixture of deuterium and tritium and deuterium alone are the primary fuels being considered initially.

Nuclear fusion reactions can be self sustaining if they are carried out at a very high temperature. That is to say, if the fusion fuel exists in the form of a very hot ionized gas of stripped nuclei and free electrons, called a "plasma", the agitation energy of the nuclei can overcome their mutual repulsion, causing reactions to occur. This is the mechanism of energy generation in the stars and in the fusion bomb. It is also the method attempted for the controlled generation of fusion energy. In this latter instance, the plasma is generated and confined by either electromagnetic fields or inertially. However, all experiments have failed to produce a self-sustaining reaction primarily because of the inability to confine the fusion reaction for a sufficient amount of time.

Previous nuclear fusion reactors for controlled, self sustaining nuclear fusion reaction have been built in order to establish the feasibility of generating useful power. These reactors, however, have not met with success, primarily because the amount of energy used to maintain the plasma has been greater than the energy generated. The reaction in such reactors has ordinarily been carried out in a very hot but tenuous fuel gas mixture of hydrogen isotopes. To avoid immediate quenching of the reaction, it has been carried out in an evacuated chamber, with means provided to prevent the reacting fuel from coming in contact with the chamber walls. The use of magnetic fields has been the method for achieving this. All of these reactors have failed, primarily because of the breakup of the plasma. There are, however, nuclear fusion research reactors which produce energy in short bursts and emit fast neutrons.

Two types of confinement are presently being used; the first and older approach is generally referred to as magnetic confinement, while the second and newer approach is called dynamic confinement. Magnetic confinement takes advantage of the fact that at the elevated temperatures required for fusion to occur (order of $10^8$ degrees) the atoms are stripped of their electrons (i.e., they are ionized) and are strongly affected and can be controlled by magnetic fields. Dynamic confinement relies upon the short times required (order of $10^{-9}$ seconds) for a high density solid ($10^{23}$ atoms/cc) to meet the Lawson criteria of $n\tau \approx 10^{14}$ sec/cc for net energy production. Briefly, in one method, a short burst of a very high energy density flux is focused upon, and completely around, a small solid pellet of fusion fuel with the aid of split beams from an appropriate laser. The outer surface of the pellet is very quickly vaporized and almost explosively pushes itself away from the pellet. The pressure on the remaining solid increases sufficiently to increase its density to perhaps $10^3$–$10^5$ g/cm$^3$. The resulting implosion is sufficient to initiate and sustain the fusion reaction and produce energetic neutrons.

SUMMARY OF THE INVENTION

The present invention overcomes the previously accepted notion that a magnetically confined fusion plasma device must be self sustaining and eliminates the necessity for continuously maintaining the plasma. Rather, the present invention utilizing either magnetic confinement or inertial confinement contemplates constantly generating new plasmas in "pulses" so that the net effect is an approximation of a self sustaining reaction with the consequent emission of neutrons. The present invention contemplates a plenum, or reaction, chamber wherein a fusion reaction is conducted in the same manner as in the prior art, that is, using a fuel such as deuterium, deuterium-tritium, lithium, mixtures thereof, or a mixture of protons and boron and confining the resulting plasma by an electromagnetic field or using inertial confinement with its laser apparatus. In addition, a so-called "working gas" is injected which surrounds the plasma and moves from the inlet end of the reaction chamber to the outlet end carrying the plasma with it. Neutrons are emitted by the fusion reaction as in the prior art and are utilized in the same manner as in the prior art. But, an added advantage of the present invention is that when the plasma is carried beyond the confining magnetic field, it releases its remaining energy to the working gas and this remaining energy can be recovered as electrical power, for instance, using magnetohydrodynamic techniques.

It is, therefore, a primary object of the present invention to provide a method and means for generating neutrons using a plasma which is free of the aforementioned and other such disadvantages.

It is another object of the present invention to provide a method and means for generating neutrons in a pulsed manner thereby eliminating the necessity for continuously maintaining the plasma.

It is a further object of the present invention to provide a method and means for generating neutrons using a plasma wherein at least a portion of otherwise lost energy may be recovered.

In addition to the advantages described above, the present invention offers the important advantage of direct energy conversion. An important use for the device is the extraction of energy as electricity.

The working fluid, moving through the plenum chamber, will be absorbing energy from some of the unavoidable losses from the reacting pulses and the walls. Thus, even before the reactions in the pulses have been completed and their energy released, the average energy of the working fluid has already increased to probably some significant fraction of an ev. In this case, the working fluid is in a state of partial ionization. The high speed passage of the charged-particle products through a channel or tube and a suitable magnetic field would then produce electrical energy, at the expense of energy in the flowing plasma. As energy is extracted from the working fluid as electricity, it would be constantly replaced from the energy released from the plasma pulses until they are used up. The rates at which the energy is released and extracted should be tailored so that the temperature of the working gas remains below a level at which it would overcome the thermal properties of wall materials.

It is here recognized that the concept of extracting electric power directly from a flowing plasma in the presence of an appropriate magnetic field (instead of going through the conventional thermal cycle) is not new. A large amount of theoretical and experimental investigations have been conducted for about two decades in order to exploit the magnetohydrodynamic (MHD) generation of electricity. The problem with previous systems is that, like conventional rocket engines, thermal energy is introduced in a concentrated form in one location, i.e., in a combustion or plenum chamber. Even when the working fluid is doped with materials with low ionization potentials, such as cesium, the percentage of energy invested in ionization, which can be extracted as electricity, is small, again due to wall material limitations. The difference in the present approach is substantial. First, the energy available from thermonuclear reactions is enormous. Second, only a small part of the available energy is initially invested in ionization. As this energy is extracted as electricity, it is immediately and continuously replaced in the flow from the remaining energy in the plasma pulses, almost as though the electrical energy were directly extracted from the pulses, and some very likely will be. Thus, the idea is to take full advantage of the properties of the wall materials over a major portion of the chamber and nozzle (or tube) so that the maximum amount of total energy involved is increased by at least one to two orders of magnitude.

In general, there are two types of energetic particles created in thermonuclear reactions, charged particles and fast neutrons. There is an important aspect of the distribution of energy between the charged and uncharged particles. It is clear that the neutrons will escape from the reacting system and deposit their energy elsewhere. Only the energy of the charged particles will be retained within the reaction region, constrained by the electromagnetic fields. Hence, only this energy, at most, will be available internally to compensate for energy losses and to sustain the thermonuclear reactions. A significant portion of the energy would be deposited in the walls and structure by fast neutron moderation. In a suitable lithium blanket, some of the neutrons could breed the tritium required in the fusion reaction.

Some, or possibly most, of the thermal content of the walls can be reintroduced into the cycle by regenerative cooling. Thus, the entering working gas, while still relatively cool compared with the reacting region, would contain a significant amount of thermal energy at the beginning of the cycle. While, as presently envisioned, a major portion of the energy will be directly converted to electricity, the remaining thermal energy could economically be converted in a conventional thermal cycle. The latter facilities would be much smaller than if they had to convert all of the energy. If the thermal cycle is not used, thermal pollution will be significantly increased.

It is, therefore, another object of the present invention, consistent with the foregoing objects, to provide a method and means to extract energy, other than from neutrons, from a pulsed plasma source.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

According to the present invention, a system for creating a fusion plasma is provided which is based on apparatus well-known in the art with certain important modifications. More particularly, the system includes a reaction chamber and means for supplying or injecting a thermonuclear fuel to the chamber. The thermonuclear fuel could be deuterium, or a mixture of deuterium and tritium, or any other known thermonuclear fuel as defined in the prior art such as, for instance, U.S. Pat. No. 3,005,767. The thermonuclear fuel is ionized to form a plasma in a manner well-known in the art and compressed and confined in a manner well-known in the art. In this regard, reference is had to the aforementioned U.S. Pat. No. 3,005,767 as well as U.S. Pat. Nos. 3,155,592, 3,006,835, 3,170,841, and 3,444,377, for example, for disclosure of apparatus that can be used and the disclosures of these U.S. patents are embodied herein by reference. While virtually any known method and means for ionizing the thermonuclear fuel and compressing the same to form a plasma can be used in the instant invention, including inertial confinement, for ease of description and only for exemplary purposes, the present invention will be described as utilizing a magnetic field created in the usual manner to confine the ionized gas and an arc struck between electrodes as the means for ionizing the fuel gas.

In addition to those elements of the apparatus and method which are known in the prior art, the instant invention relies on the use of a so-called "working gas" to fill the space between the plasma and the wall of the reaction chamber and, since the working gas is introduced under pressure and moves longitudinally through the reaction chamber, to surround and carry the plasma through and out of the reaction chamber. The working gas should be a material with a low Z and, ideally, it is hydrogen ($Z=1$). By using the working gas, the necessity for maintaining a vacuum in the reaction chamber is eliminated and losses due to occasional ionized particles from the plasma escaping the magnetic field and striking the chamber wall are minimized. Also, the working gas acts to stabilize the confined plasma, thereby impeding its break-up before the fusion process completes its cycle. Thus, a high flux density of energetic neutrons (about 14 Mev) are produced with, as an added advantage, any other energy produced by the reaction being transferred to the working gas from which it can be extracted by known MHD means as aforementioned or passed out of the apparatus.

Figure 1:
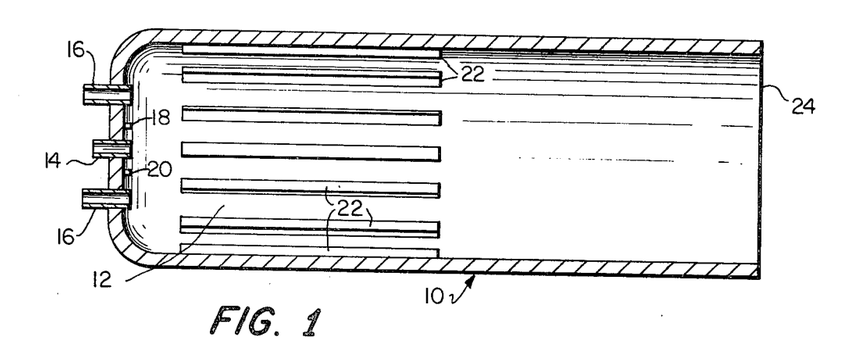
FIG. 1 is a partially schematic longitudinal sectional view of a neutron generator according to the present invention.

Referring now to the drawings in detail, wherein like numerals indicate like elements, there is shown in FIG. 1, in partially schematic form, the apparatus of the present invention generally designated by the numeral 10. The apparatus comprises reaction chamber 12, conduit means 14 for introducing the thermonuclear fuel in short "bursts" or pulses, or solid pellets, and conduit means 16 for introducing the working gas in a continuous manner. The pumping means and valves associated with the introduction of the fuel are conventional as disclosed in the aforementioned prior art patents. Similarly, the same type of pumping and valving means are used to control the introduction of the working gas, as would be apparent to one skilled in the art. As already mentioned, the working gas is continuously pumped into the reaction chamber while pulses or pellets of relatively small amounts of fuel are fed into a preparatory chamber. In the magnetic confinement configuration, an arc is struck between electrodes 18 and 20 to heat and ionize the fuel after which the compressing and confining means schematically shown as 22 are activated, these last-mentioned means being described more fully herinbelow. The electric current to electrodes 18 and 20 is then shut off. When means 22 are activated, the ionized fuel is further ionized and compressed; the fusion reaction is initiated and continues as the reaction plasma is carried along with the moving working gas. When means 22 are deactivated the reacted plasma then dissipates within the working gas and is carried out through open end 24 of the reaction chamber. Another cycle begins with the introduction of another burst of fuel through means 14. Conventional controlling means (not shown) control the sequential introduction of the fuel, striking of the arc, and activation and deactivation of the various means 18, 20 and 22.

In accordance with the preferred embodiment of the present invention, hydrogen gas forms the main working gas. The hydrogen gas is continuously pumped into the combustion chamber 12 as indicated in FIG. 1. Pulses of relatively small amounts of a fusion fuel such as a mixture of deuterium and tritium, or deuterium alone are also fed into the chamber 12. Thereafter the fusion fuel is ionized by an electric arc. This arc imparts up to 0.5 Kev by ohmic heating. The ionized fusion fuel is rapidly confined and rapidly compressed by an electromagnetic field to energy levels of about 10 Kev to 100 Kev to permit thermonuclear reactions to occur. The entire reacting fusion fuel pulse with its associated electric and magnetic field is permitted to move at the fluid velocity of the working hydrogen gas.

After sufficient fusion reaction has occurred to significantly increase the energy of the fusion fuel pulse to energy levels of about Mev's the associated electric and magnetic fields for that pulse are turned off and the naturally unstable nature of the plasma will allow and enhance the mixing of the plasma pulse with all of its properties with that of the working gas. The high energy plasma then turbulently mixes with the background gas transferring and distributing its extremely high energy. This is the occurrence of instabilities as mentioned below.

Obviously, the maximum amount of thermal energy designed to be introduced into the combustion chamber is as usual limited by the maximum temperature and heat transfer rates that can be tolerated by the chamber wall. The chamber wall is constructed of any material conventionally used in a high temperature environment such as those materials used in the aforementioned prior art patents. In the neutron source constructed in accordance with the precepts of the present invention, the problems created by the high temperatures of the reaction are avoided by containing those temperatures in the center of the combustion chamber away from the chamber walls. As will be readily appreciated by one skilled in the art, the hydrogen working gas is continuously flowing into and out of the chamber and the fuel is injected in short bursts and immediately ionized. Thus, the ionized fuel which is then further compressed and confined to form a plasma centered in the reaction chamber is immediately surrounded by the working gas which forms an insulating layer between the plasma and the chamber walls without in any way impeding the outward flow of neutrons. Consequently, the chamber walls are kept at the relatively lower temperatures that can be tolerated by the wall material by the working fluid. A much higher overall energy density can be handled, since the very highest energy densities (the fusing plasma fuel) are constrained in the inner gaseous regions away from all material surfaces within the chamber. The background gas near the wall has the usual constraints governed by its interaction with the material wall. That is, the background gas can have energy levels commensurate with the maximum levels permitted in, for example, a combustion chamber (i.e., of the order of 0.1's ev.). Operating conditions for the plasma pulses will be quite different from those being used by others. Assuming the working fluid velocity in the plenum chamber is small, say less than 100 M/sec, it is clear that the residence time for the plasma in a reasonably sized chamber is of the order of $10^{-3}$ to $10^{-2}$ seconds. This is all the time available for the completion of the reactions. By comparison, the minimum confinement times required by other systems is seconds. According to the Lawson criterion, the minimum requirement for net power production is given by $n_i \tau \propto f(T)$ where $n_i$ is the number density of the thermonuclear reacting ions, $\tau$ is the average confinement time of the reacting nuclei and T is the average kinetic temperature of the reacting plasma. Since the kinetic temperature required in the reacting plasma is a function of the ratio of tritium to deuterium, and the optimum value of this ratio has not been determined, it can be assumed that f(T) in this equation is the same for all fusion devices. Therefore, the present concept requires reacting particle densities $10^2$ to $10^3$ times larger than the maximum densities being considered by others.

Maximum values of $10^{15}$ nuclei/cm$^3$ for the particle densities, in conventional systems, were determined by trying to generate an average power density of no more than 100 watts/cm$^3$ in the entire fusion device, which is equivalent to the maximum presently utilized in fission reactors. Thus, for the present, we also assume an average power density of 100 watts/cm$^3$ for the entire reactor, even though there is not an exact parallel between the conditions, e.g., heat transfer and operating pressures, which limit the power density of a fission reactor and those which might apply to the instant device. Nevertheless, there are probably similar limitations upon the power transfer in the instant system as there is in other electric power systems. In any event, these conditions are assumed to be a reasonable starting point. Some more investigation will be required before optimum conditions can be determined. At this point, the precise values are not critical and can be juggled significantly without destroying or altering the basic premises the underlying the present invention.

It is clear from the above equation that in order to decrease the required confinement times $10^{-3}$ to $10^{-2}$ second, the number densities in the reacting plasmas will have to be of the order of $10^{17}$ to $10^{18}$ nuclei/cm$^3$. Since the power density is proportional to the square of the particle density, the corresponding power densities in the plasma pulses become $10^6$ to $10^8$ watts/cm$^3$. For the present system this is reasonable, since after the thermonuclear reactions have occurred the average energy per particle in the pulses plasma region is on the order of Mev's, whereas the average energy per particle for the entire system, including the extracted energy, will be of the order of 10 ev to possibly more than 100 ev. Assuming the background or working gas had originally a relatively negligible amount of intrinsic energy, all of the energy in the system emanates from the plasma pulses. Therefore, the power density in the pulses must be $10^4$ to $10^5$ greater than the system power density, or $10^6$ to $10^8$ watts/cm$^3$. It is seen that the operating conditions for the present invention are self-consistent and do not violate the present state of knowledge, although they would be impractical for the large relatively static reaction zones being considered by others.

It is seen that the present invention takes advantage of the unstable nature of the plasma which had previously been considered a barrier to the success of a fusion device. In the present invention, if during the short time that the integrity of the nuclear reacting plasma is maintained, a significant portion of the nuclear energy is released, it does not then matter that instabilities disperse the high energy plasma. Indeed, the present invention takes advantage of the instability of the plasma to release its energy to the working fluid. Most conventional reactors recover the energy thermally, i.e., simply as heat, and convert it into a more useful form in a separate conventional thermal cycle. In those reactors the thermal energy is deposited in the walls.

The neighborhood immediately surrounding the reacting plasma in conventional systems consists of a high vacuum. One of the reasons is that at room temperatures and at the low maximum number densities of the cold fusionable gas, the pressure is no more than $10^{-4}$ atmospheres. Thus in order to feed in the raw fusion fuel, the chamber would have had to be evacuated to far below this value. Other reasons are based upon the effect that contaminants might have upon the reacting plasma. It is well known that the rate of energy loss in bremsstrahlung radiation increases with ionic charge, which is equal to the atomic number Z in a completely ionized gas consisting only of nuclei and electrons. Consequently, the presence of impurities of moderate and high atomic number in the thermonuclear system will increase the energy loss. As a result the minimum temperature at which there will be a net production of energy will also be increased. On the other hand, in the present system energy is transferred directly to the working gas which is preferably hydrogen. Fully ionized hydrogen, deuterium and tritium each have Z's of unity, thereby minimizing the energy loss due to bremsstrahlung emission. Thus, the plasma created in a device constructed in accordance with the present invention need not operate in a vacuum. In fact, the presence of background gas at relatively high pressures (on the order of 10 to $10^2$ atmospheres), due to its inertial mass, tends to decrease the unstable character of the reacting plasma, thereby increasing the confinement time available for nuclear fusion. The dynamic damping available from the background gas may range from $10^5$ to $10^{10}$ atmospheres.

However, the presence of a low energy background gas surrounding the high energy reacting plasma presents a potential problem of charge-exchange. A slow, neutral hydrogen particle approaching the high energy plasma is bombarded by energetic electrons and rapidly ionized. When ionized its chances of passing through the magnetic field surrounding the plasma becomes very small. Indeed calculations indicate that the probability of the neutral hydrogen particles entering the plasma is less than $10^{-100}$. This number is sufficiently small so that it can be said that the neutral particles will not enter the region of the reacting plasma.

Sustantiation of the above result, i.e., that charge-exchange should not be a problem for the proposed system, since the reacting plasma pulse is surrounded by a protective sheath of electrons and ionized particles, can be found in the interpretation of the experimental results from several studies of the aerodynamics of arc columns. It has been found that the drag for an arc column is more than five times larger than an equivalent solid body. Certainly an arc cannot be more "solid" than a solid, indicating that the effective arc size must greatly exceed the observed value. It is apparent that the increased size must be due to the surrounding protective sheath. Another potential benefit available from the mass of the protective sheath, could be to further stiffen the plasma pulse within, tending to further delay the onset of instabilities in the pulse.

It is seen that the generation of energy in the present concept for a neutron generator involves the following:

small pulses of relatively dense plasma, surrounded by a working fluid, are initiated, compressed and confined by electromagnetic fields. The working fluid aids in stabilizing the confined plasma, regardless of the primary means used for confining the plasma, e.g., electromagnetic fields, pinch effects, etc. In addition, the working fluid absorbs the high energy produced in the plasma pulses. Due to the relatively high number density of the reacting plasma, which is one to three orders of magnitude higher than can safely be accommodated by previous concepts, the required confinement time is reduced according to the Lawson criterion to as low as milliseconds.

With each fusion fuel pulse forming a plasma to thereby produce neutrons and then being dissipated into the working gas and carried out of the chamber, followed by the injection of another deuterium pulse, an approximation of continuous operation is achieved. It is stressed that this is not truly continuous operation but merely an approximation.

In one embodiment of the present invention confinement and initiation of the plasma relies upon the well-known pinch effect. The pinch effect is the self-constriction that occurs in a plasma as a result of the passage of a unidirectional current. Such a current produces an azimuthal self-magnetic field and tends to constrict the plasma. Sufficiently large currents (of the order of $10^7$ amps) will provide the requisite magnetic confinement, plus some additional ohmic heating.

Figure 2:
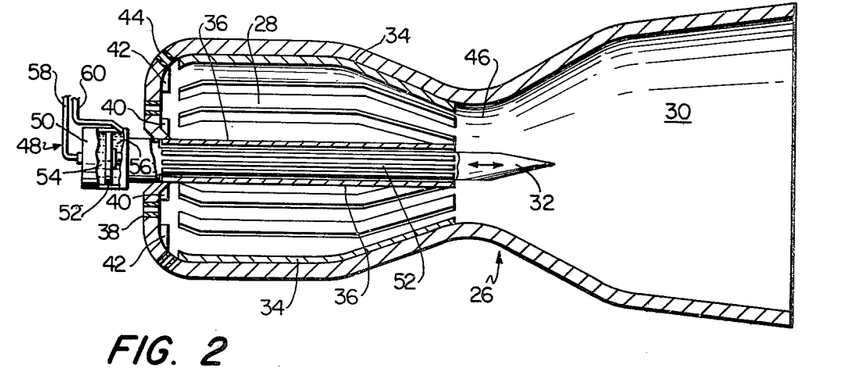
FIG. 2 is a longitudinal sectional view of one embodiment of a neutron generator constructed in accordance with the present invention.
Figure 3:
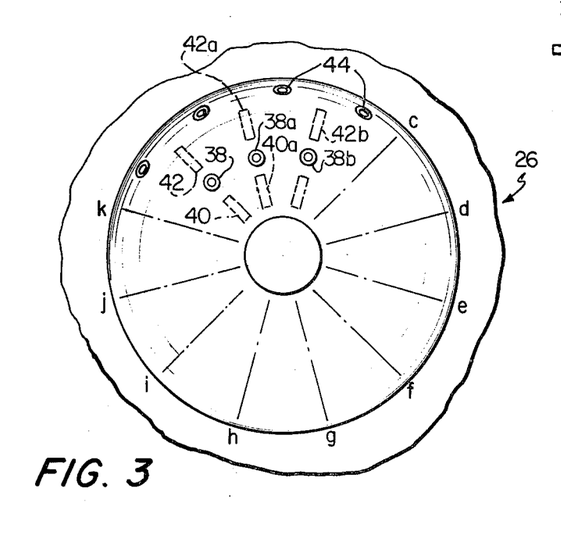
FIG. 3 is a left side view of the neutron generator shown in FIG. 2.

Referring now to FIGS. 2 and 3, there is shown a reactor in accordance with the present invention designated generally as 26. As shown, the reactor has a chamber 28 and a convergent-divergent nozzle 30. Moreover, a center body or reciprocable plug 32, whose purpose will be later described is positioned within the reactor 26. A plurality of first electrodes 34 are attached to the wall of chamber 28 and extend from the front end thereof back partially through the throat of the nozzle 30. The electrodes 34 are spaced fully around the wall of chamber 28. In a like manner, a plurality of opposed second electrodes 36 are fixed to the chamber so that the center body 32 is free to slide past them. Electrodes 36 each have the same axial length as electrodes 34. A plurality of ports 38 are spaced around the front end at an intermediate circumference of the reactor 26. These ports 38 are appropriately connected to a source of fusionable fuel such as deuterium. In a like manner, a plurality of electrodes 40 and 42 are spaced about the front face of the reactor 26. These electrodes 40 and 42 are connected to equal and opposite sources of direct current in a known manner. The electrodes 34 and 36 are also connected to equal and opposite sources of direct current. There are, thus, formed a plurality of "sets" of ports and electrodes, each "set" containing one port 38, one pair of opposed ionizing electrodes 40 and 42, and one pair of opposed compressing electrodes 34 and 36.

Ports 44 are spaced about the face of reactor 26. These ports 44 are connected to a source of working gas which may be hydrogen.

A reactor constructed as shown in FIGS. 2 and 3 operates as follows: small amounts of deuterium or a mixture of deuterium and tritium, for instance, are fed through port 38 on the front face of the reactor 26. An arc is struck through the fuel by means of its associated electrodes 40 and 42. This arc quickly heats and ionizes the material. The charge through the electrodes 40 and 42 is then turned off. Electrodes 34 and 36 are turned on before electrodes 40 and 42 are turned off. The ionized plasma now becomes attached to the elongated electrodes 34 and 36, and with sufficient current ($10^6$ to $10^8$ amps) the electrodes 34 and 36 begin to constrict the plasma to initiate a thermonuclear reaction. It should be noted that the working hydrogen gas is continuously fed into the chamber 28 at a pressure of the order of 1 to 100 atmospheres. As the pinching effect begins, the plasma is surrounded by the working hydrogen gas. At the same time, the plasma is being swept down the chamber together with the working gas until they both pass the end point of the electrodes 34 and 36. At this point the plasma is released and dissipates into the working gas.

In the meantime, while the plasma is still in the reaction chamber between compressing electrodes 34 and 36, another pulse of fuel is injected through one of ports $38a \ldots n$. An arc is struck through associated electrodes $40a \ldots n$ and $42a \ldots n$ to heat and ionize the material. The current is turned on to associated compressing electrodes $34a \ldots n$ and $36a \ldots n$ and the current to electrodes $40a \ldots n$ and $42a \ldots n$ is switched off. The plasma moves with the working gas along electrodes $34a \ldots n$ and $36a \ldots n$ until it reaches the nozzle. During this time still another pulse is injected through a third of ports $38a \ldots n$, etc. and the procedure is repeated until each set of ports and electrodes has been used. Thereafter, the cycle begins again with port 38 and electrodes 42 and 44.

While FIGS. 2 and 3 illustrate 12 sets (n=12), it will be apparent to one skilled in the art that the total number of sets could vary depending on the size of the device and other such practical limiting factors. Also, it will be equally apparent to one skilled in the art that the sequence of operation can follow the circular order in which the sets are arranged, that is, set 34, 36, 38, 40, 42; set a; set b; set c; ... set k, in a counterclockwise fashion, in a clockwise fashion, in a random fashion, or in any other sequence such as set 34, 36, 38, 40, 42; set f; set k; set e; set j; set d; ... set g; set a. Thus, even though there is sequential operation, there is an approximation of continuity. It will also be apparent that the residence time of any one plasma pulse and, consequently, the timing of the sequential operation, is dependent on the size of the device, the velocity of the moving working gas, etc. This is easily ascertainable and suitable control means are readily available to provide the requisite timing.

Figure 3A:
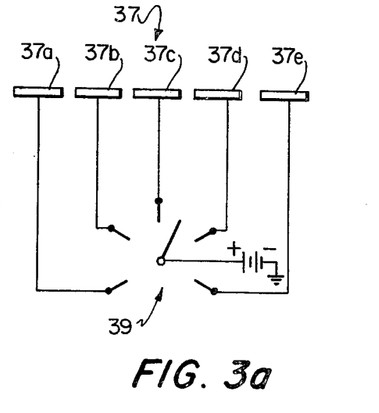
FIG. 3a is a plan view of an alternate embodiment of an electrode used in the device of FIGS. 2 and 3.

In addition, another embodiment is contemplated wherein compressing electrodes 34 and 36 are in the form of segmented rails as shown in FIG. 3a. Electrode 37 is divided into segments $37a \ldots e$, for example, with each segment being activated by suitable means such as rotary switch 39 or equivalent solid-state switching means. Thus, a pulse can be moving along electrode 37 with segments $37a \ldots e$ being switched on in sequence to follow the pulse. Another pulse can be following the first pulse and be at, say, segment $37a$ or $37b$ when the preceding pulse is at, say, segment $37d$ or $37e$, etc.

Referring to the center body or reciprocable plug 32, it is first pointed out that for ease of illustration it is depicted as being smaller in diameter than the constricted portion or throat 46 of nozzle 30 while, in fact, the main body of plug 32 is at least as large as throat 46 and tapers inwardly toward its rearward end. It is positioned by reciprocating means 48 and is used to constrict or throttle the flow of gases by making the throat area smaller. This center body is not necessary to the practice of the invention but adds a dimension of adjustability. While any well-known means for creating reciprocal motion for adjusting its position may be used to reciprocate center body 32, one exemplary such means 48 is a hydraulic cylinder 50 having a piston 52 thereby forming chambers 54 and 56 being fed by conduits 58 and 60, respectively. Utilizing conventional control means (not shown) fluid pressure can be applied to either of chambers 54 and 56 to thereby move piston 52 forwardly or rearwardly on demand. Such piston 52 is connected to center body 32, center body 32 will reciprocate to its appropriate operating position.

Figure 4:
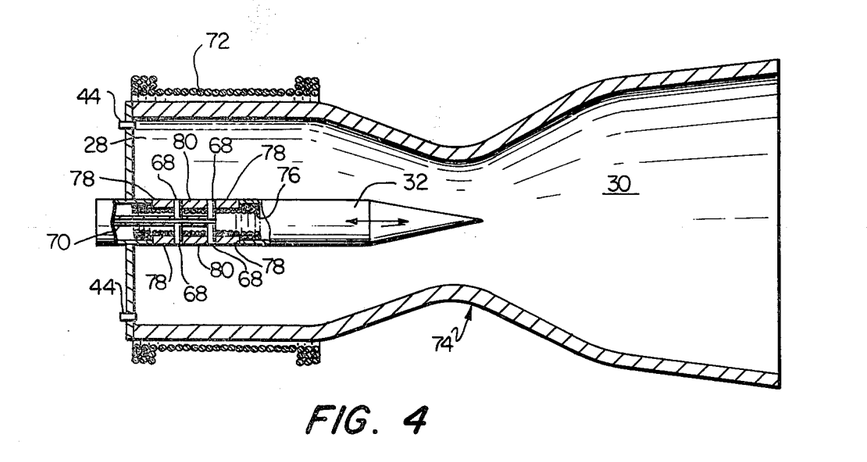
FIG. 4 is a longitudinal sectional view of yet another embodiment of a neutron generator constructed in accordance with the present invention.

Referring now to FIG. 4, there is shown still another embodiment of the present invention wherein magnetic means are used to constrict the fusionable material. As shown, the reactor 74 includes a chamber 28 and a nozzle 30, as well as a reciprocable center body or plug 32. Solenoid 72 surrounds the chamber 28. In addition, a second solenoid coil 76 is provided within the reciprocable center body 32 which is partially hollow. Ports 68 are provided for adding fuel into the chamber 28 from central passage 70 in body 32. At the end of the ports 68 there are provided electrodes 78 and 80 to initiate heating and ionization of the fuel as it is fed through the ports 68.

The region of enhanced magnetic field is known as a magnetic mirror. The reason for this is that charged particles moving from the region of lower magnetic field strength to that of higher field strength, will be reflected back into the former region. Thus, a form of potential well is provided. This well inhibits the escape of many of the charged particles (a loss of energy) at the ends of the toroidal magnetic field.

To add energy to the plasma, it is necessary to compress it adiabatically. Axial compression can be achieved by moving the magnetic mirrors together, either mechanically or electrically. Electrical movement is achieved by conventional switching techniques (not shown). Of course, radial compression is obtained by increasing the strength of the magnetic field by increasing the current through the coil 72.

The coils 72 and 76 are wound to work in opposition to each other and thereby compress the plasma pulses to initiate the reaction. The plasma then expands against the magnetic mirror until it releases energy. Thereafter, a cycle begins again.

One of the advantages of the double magnetically constricted plasma is that the inner surface of the plasma will be much more stable than the outer surface. Advantage of this circumstance is taken to increase the confinement time.

The operation of the apparatus illustrated in FIG. 4 proceeds as follows:

Fuel is injected from ports 68. An arc is struck between the electrodes 78 and 80. The fuel is quickly heated and ionized. The magnetic field is then turned on by adding current to the coils 72 and 76. The magnetic field compresses the plasma to produce the thermonuclear reaction. After a sufficient amount of time, the energy is increased and the plasma begins to expand against the magnetic field until it spills over the magnetic mirrors at the ends of the coils. Thereafter, the magnetic field is reduced and the plasma is carried out of the reactor 74 by the working gas which has been introduced through ports 44. As it is carried out, the plasma intimately mixes with the working gas. Thereafter the cycle is repeated.

Although the coils illustrated in FIG. 4 are shown in conventional form, it should be understood that other equivalents could be substituted therefor. For example, superconducting magnetics may be provided to reduce the power requirement for the system.

To increase neutron production and decrease ignition temperature, it is preferable that the fusionable material have at least some tritium contained therein, and thus is generated in a suitable lithium blanket.

Figure 5:
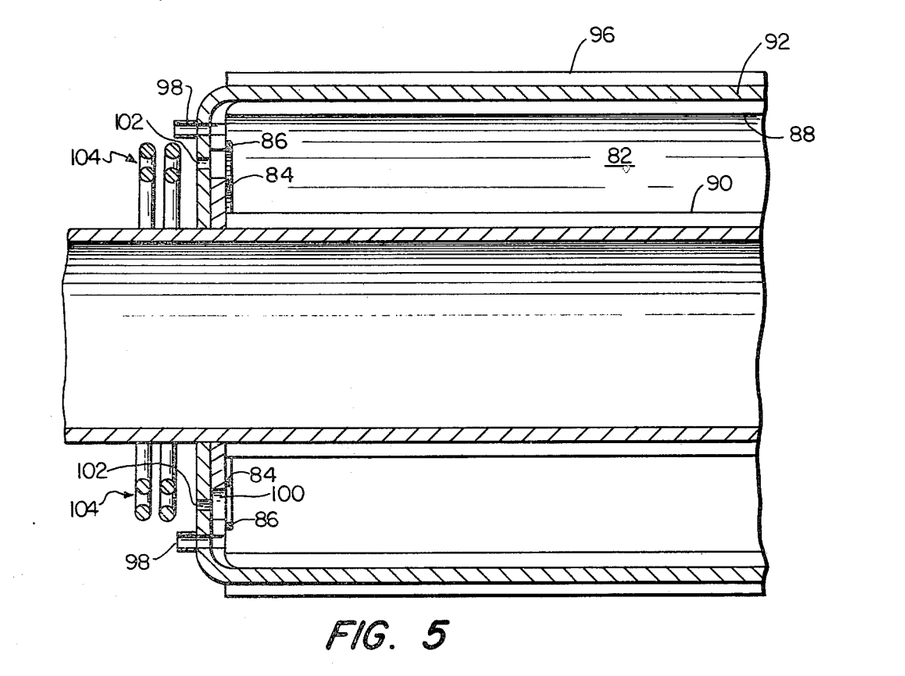
FIG. 5 is a partially schematic longitudinal sectional view of still another embodiment of a neutron generator constructed in accordance with the present invention.

A closed system embodiment of the invention is shown in FIG. 5. It should be emphasized that the essential conceptual features and the basic principles of operation are not dependent on the specific detailed configuration. In this version, the gas consisting of the fuel mixture is formed in the shape of a toroidal ring in the cylindrical annular plenum chamber designated as 82. A magnetic field surrounding the fuel mixture which is ionized by electrodes 84 and 86, is induced by passing a current through the electrodes 88 and 90 along the chamber wall 92 and the center body wall 94. The rotational transform required to produce a helical magnetic field around the reacting fuel mixture can be obtained from an electric current passing through the sheet conductor 96 surrounding the chamber.

Operation of the device constructed as shown in FIG. 5 is as follows:

A working gas, preferably consisting of hydrogen, is continuously pumped into and through the plenum chamber through large ports 98 spaced around the chamber. Much smaller amounts of the fuel mixture are fed into a U-shaped torus 100 on the face of the chamber, through a large number of very small ports 102 (or possibly even a porous wall). As the toroidal fuel mixture forms, it is heated and ionized by an arc struck between electrodes 84 and 86. At the same time arcs are struck across the rails 88 and 90 in the plenum chamber 82, close to the U-shaped toroidal section on the chamber face, and maintained by passing current through the rails and arcs in series, forming a helical winding around the ionized toroidal fuel mixture. The ionized toroidal fuel mixture is injected into the plenum chamber by a magnetic pulse from the solenoid 104 on the outside face of the plenum. The injection velocity is adjusted so that it matches the fluid velocity of the working gas in the vicinity of plenum face. The entire subsystem consisting of the arcs and the ionized toroidal fuel mixture is swept down the plenum chamber with the working gas. During this period the helical magnetic field produced by the current passing through the rails and arcs and the external sheet wrapped around the chamber wall adiabatically compress the fuel mixture to initiate and sustain thermonuclear reactions. At the end of the chamber the arcs are extinguished, and since the thermonuclear plasma with its high energy content is no longer electromagnetically constrained it almost explosively and irreversibly mixes with the background gas. Thereafter the cycle begins again.

It is also possible to use segmented rails, in place of continuous rails 88 and 90, each set with its own circuits, in order to approximate continuous energy addition. That is, while each new plasma pulse is being initiated, several others are being swept through the plenum chamber.

Another possible variation might have each set of rails (a set of rails consists of a rail in the outer chamber wall and its associated rail in the center body wall) connected directly to the MHD electrodes and, through the load, to each other. In this case it would not be necessary to strike and maintain the arcs in the working gas to complete the circuits.

It is noted that the induced magnetic field strength about the conductors falls off as the distance from them increases. Thus, the total induced magnetic field, due to its "loose" winding about the reacting fuel mixture, would approximate the desired minimum—B or average minimum—B configuration.

Thus, it can be seen that the objects set forth at the outset have been successfully achieved. Since many embodiments may be made of the instant inventive concepts, and since many modifications may be made of the embodiments hereinbefore described, it is to be understood that all matter herein is to be interpreted merely as illustrative and not in a limiting sense.

What I claim is:

1. A method of generating neutrons comprising the steps of:
   (A) cyclically admitting quantities of thermonuclear fuel into a plenum chamber;
   (B) ionizing each quantity of fuel to form a pulse of relatively dense plasma immediately after it is admitted into the chamber;
   (C) confining each plasma pulse within an electromagnetic field in such chamber;
   (D) continually admitting a separate working gas at a predetermined velocity at a position apart from, but in proximity to, where said thermonuclear fuel is admitted to thereby surround each plasma pulse with said working gas within said electromagnetic field to stabilize and isolate said plasma pulse from the walls of said plenum chamber;
   (E) essentially adiabatically comprising said plasma pulse with said electromagnetic field to initiate a reaction in said plasma pulse with said working gas surrounding it;
   (F) moving said working gas and reacting plasma pulse through and out of said plenum chamber into a nozzle means and releasing said reacting plasma pulse from said electromagnetic field by removig said electromagnetic field when the plasma pulse passes into the nozzle means thereby mixing said pulse with said working gas and releasing its remaining energy thereto substantially isothermally in said nozzle means;
   (G) adjusting the area of the throat of said nozzle means by adjusting the position of a reciprocable center body which extends through said chamber into said nozzle means.

2. A method as claimed in claim 1, wherein said fuel is deuterium or a mixture of deuterium and tritium and said working gas is hydrogen.

3. A method as claimed in claim 1, wherein said nozzle means is a convergent-divergent nozzle and said mixing of said working gas with said reacting plasma is performed in the divergent portion of said nozzle substantially isothermally.

4. A method as claimed in claim 1, wherein said nozzle means is a tube adapted to provide a relatively low velocity plasma.

5. A method as claimed in claim 4, further comprising magnetohydrodynamically converting the energy of said working gas to electrical energy.

* * * * *

UNITED STATES PATENT AND TRADEMARK OFFICE
CERTIFICATE OF CORRECTION

PATENT NO. : 4,269,659

DATED : May 26, 1981

INVENTOR(S) : Leon Goldberg

It is certified that error appears in the above-identified patent and that said Letters Patent are hereby corrected as shown below:

Column 7, Line 37, "the" (first occurrence) is deleted;

Column 10, Line 26, after "third" --set-- is inserted;

Column 14, Line 1, "comprising" is changed to --compressing--;

Column 14, Line 8, "removig" is changed to --removing--;

Column 14, Line 13, after "means;", --and-- is inserted.

Signed and Sealed this

Eighteenth Day of August 1981

[SEAL]

Attest:

GERALD J. MOSSINGHOFF

*Attesting Officer*  *Commissioner of Patents and Trademarks*